Feb. 11, 1941.  L. J. MILLER  2,231,586
FENDER EXHAUST SYSTEM FOR AUTOMOTIVE VEHICLES
Filed May 17, 1939  2 Sheets-Sheet 1
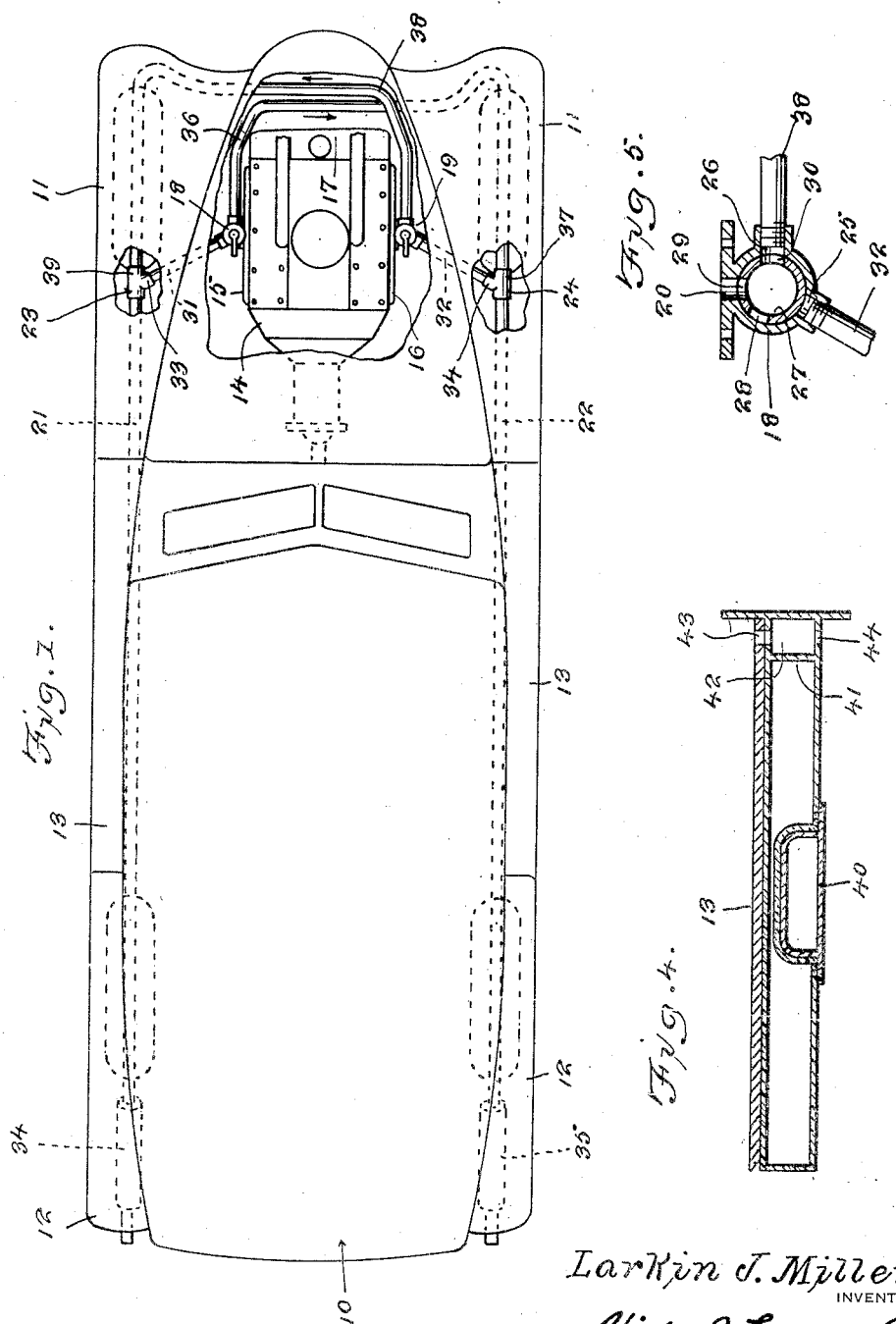
Larkin J. Miller
INVENTOR
BY Victor J. Evans & Co.
ATTORNEYS Feb. 11, 1941.  L. J. MILLER  2,231,586
FENDER EXHAUST SYSTEM FOR AUTOMOTIVE VEHICLES
Filed May 17, 1939  2 Sheets-Sheet 2
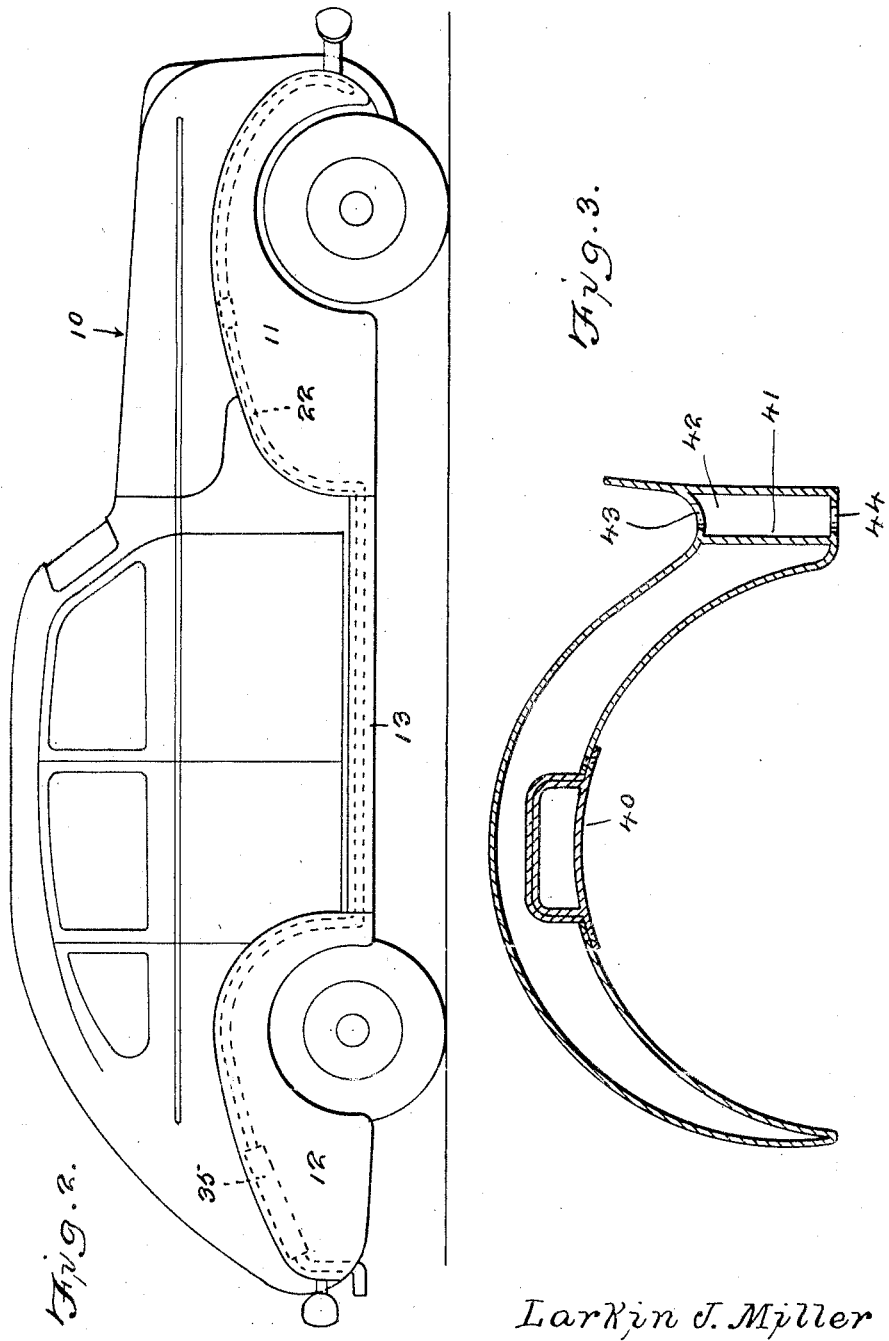
Larkin J. Miller
INVENTOR
BY Victor J. Evans & Co.
ATTORNEYS

UNITED STATES PATENT OFFICE 2,231,586

FENDER EXHAUST SYSTEM FOR AUTOMOTIVE VEHICLES

Larkin J. Miller, King City, Mo.

Application May 17, 1939, Serial No. 274,261

4 Claims. (Cl. 180—1)

My invention relates to a new and improved exhausting system for automotive vehicles.

An important object of my invention is to provide an exhausting system for automotive vehicles that is incorporated in the fenders and running board thereof.

Another object of my invention is to provide an exhausting system for automotive vehicles that is mounted in appressed relation with the underside of the fenders to heat the same in cold weather and to prevent the formation of ice and slush thereon.

Still another object of my invention is to provide an exhausting system for automotive vehicles that passes in close proximity to the radiator of the vehicle to heat the same and thereby prevent the freezing of the liquid therein.

Yet another object of my invention is to provide an exhausting system for automotive vehicles that is positioned laterally of the body of the vehicles thereby substantially eliminating the possibility of poisonous carbon monoxide gases entering the interior of the vehicle through the floor boards thereof.

A further object of my invention is to provide an exhausting system for automotive vehicles that is inexpensive to manufacture, and that may be easily incorporated with the fenders of the vehicle in a manner to greatly strengthen and reinforce the same.

Other objects and advantages of my invention will be apparent during the course of the following description.

In the drawings, forming a part of this specification, and in which like numerals are employed to designate like parts throughout the same, Figure 1 is a top plan view of an automotive vehicle having parts broken away, and showing my device incorporated therewith, Figure 2 is a side elevation thereof, Figure 3 is a vertical sectional view of a fender of the vehicle and showing a modified form of the exhausting conduits, Figure 4 is a vertical sectional view of the running board of the vehicle and further illustrating the modification of Figure 3, and Figure 5 is a vertical sectional view of a circular slide valve forming a part of my invention.

In the accompanying drawings, wherein for the purpose of illustration, are shown preferred embodiments of my invention, the numeral 10 designates an automotive vehicle of conventional design and construction including front fenders 11, rear fenders 12, and running boards 13 positioned laterally of the body of the vehicle and connected at either end thereof to fenders 11 and 12. The vehicle is motivated by the motor 14 having exhaust manifolds 15 and 16 at either side thereof, and the radiator 17 is positioned forwardly of the motor and connected thereto in the conventional manner.

The circular slide valves 18 and 19 are carried by the exhaust manifolds 15 and 16 and communicate therewith through the port 20. The valves 18 and 19 are each constructed in the manner clearly illustrated in Figure 5, each being provided with spaced discharge ports 25 and 26 which may be opened or closed by rotating the sleeve 27, which is provided with spaced openings 28, 29 and 30. The exhaust pipes 21 and 22 are positioned laterally of the body of the vehicle 10 and in appressed relation with the underside of the fenders 11 and 12 and the running board 13 and the forward ends thereof are provided with Y-couplings 23 and 24. The connecting pipes 31 and 32 join the discharge port 25 of the valves 18 and 19 to the branches 33 and 34 of the couplings 23 and 24 to effect communication therebetween. The exhaust pipes 21 and 22 extend rearwardly of the rear fenders 12 and mufflers 34 and 35 are incorporated therewith and secured to the underside of the rear fenders 12. An auxiliary pipe 36 has one end received within the discharge port 26 of the slide valve 18 and the other end thereof received by the branch 37 of the Y-coupling 24. An auxiliary pipe 38 has one end received by the discharge port 26 of the valve 19 and the other end thereof is received within the branch 39 of the Y-coupling 23. The auxiliary pipes 36 and 38 extend contrariwise around the front of the vehicle and in close proximity to the radiator 17.

The operation of my device is as follows:

When the automobile is being driven in very cold weather, or on snowy or slushy streets, the fenders become very brittle and often crack or rupture. This is particularly true if the slush becomes agglomerated on the underside of the fenders in sufficient quantity so that its weight will cause the chilled fenders to crack. To prevent this from occurring the sleeve 27 in the slide valves 18 and 19 is rotated to the position as illustrated in Figure 5 with the opening 29 in register with the port 20 and with the opening 30 in register with the discharge port 26. It may be seen that the opening 30 does not register with the discharge port 25 and that the exhaust gases issuing from the exhaust manifolds 15 and 16 will flow forwardly through the auxiliary pipes 36 and 38 around the radiator 17 and into the exhaust pipes 21 and 22 where they will be discharged rearwardly of the vehicle. The heated exhaust gases, in making this circuitous escape, will radiate sufficient heat to prevent the formation of ice or slush on the undersides of the fenders, and by causing the pipes 36 and 38 to extend contrariwise around the front of the vehicle, the liquid in the radiator will be prevented from freezing.

Many of the conventional types of automobiles are provided with head lights the lead wires of which pass through the fenders, and when the slush forms on the underside of the fenders the wires are frequently shortcircuited thereby greatly increasing the danger of fire. It may readily be seen that all danger of shortcircuiting will be substantially eliminated if the fenders are sufficiently heated to prevent the formation of ice. By positioning the exhaust pipes 21 and 22 laterally of the body of the vehicle, the poisonous carbon monoxide in the exhaust cannot gain access to the interior of the vehicle through the floor boards as frequently occurs when the exhaust pipes are positioned directly under the body.

If desired, the fenders and running boards of the vehicle may be of hollow constructions, as illustrated in Figures 3 and 4, and an exhaust conduit 40 may be bolted or otherwise secured to the bottom wall thereof. The hollow construction of the fenders and running board will provide an air space therein which will be heated by the exhaust gases to prevent the formation of agglomerated slush thereon. When the conduits 40 are used, the connecting pipes 31 and 32 and the auxiliary pipes 36 and 38 will communicate with the forward end thereof. By incorporating the conduits with the fenders in the manner here illustrated, the fenders will be greatly strengthened and reinforced and a tendency for them to loosen and produce rattles will be substantially eliminated. In order that the heated air space within the fenders and running board will not be communicated to the interior of the body, I have provided a vertical closure wall 41 in spaced relation with the body of the vehicle which provides an insulating pocket 42, and the spaced upper and lower ports 43 and 44 permit the same to communicate freely with the atmosphere thereby insuring a quantity of cool air at all times between the heated fenders and the body of the vehicle. The manner of operation and advantages associated with this form of the invention are so similar to the form hereinbefore described that no further explanation is thought to be necessary.

It is to be understood that the form of my invention, herewith shown and described, is to be taken as a preferred embodiment of the same, and that various changes in the size, shape and arrangement of parts may be resorted to without departing from the spirit of my invention, or the scope of the appended claims.

Having thus described my invention, I claim:

1. In an automotive vehicle having an engine, exhaust manifolds connected to the engine at opposite sides thereof, a radiator arranged forwardly of the engine and, fenders and running boards extending along the opposite sides of the vehicle, exhaust pipes directly communicating with the exhaust manifolds at the opposite sides of the said engine and each extending rearwardly thereof laterally of the body of the vehicle and in appressed relation with the fenders and running boards thereof, auxiliary pipe means communicating at one end with each of the said exhaust manifolds and positioned contrariwise of the front of the vehicle and in close proximity to the radiator and each communicating at its other end with the said first-mentioned exhaust pipes, the heated exhaust gases having access to the said pipes and acting to heat the fenders to prevent the formation of ice thereon and to heat the said radiator to prevent freezing of the same.

2. In an automotive vehicle having an engine, exhaust manifolds connected to the engine at opposite sides thereof, a radiator arranged forwardly of the engine and, fenders and running boards extending along the opposite sides of the vehicle, exhaust pipes communicating with the exhaust manifolds at the opposite sides of the said engine and extending rearwardly thereof laterally of the body of the vehicle and in appressed relation with the fenders and running boards thereof, auxiliary pipe means communicating at one end with each of the said exhaust manifolds and positioned contrariwise of the front of the vehicle and in close proximity to the radiator and each communicating at its other end with the said first-mentioned exhaust pipes, and means to selectively direct the heated exhaust gases directly into the exhaust pipes or to direct the same into the exhaust pipes by way of the said auxiliary pipes, whereby the pipes may heat the fenders to prevent the formation of ice thereon or heat the radiator to prevent freezing of the same in addition to heating the said fenders.

3. In an automotive vehicle having an engine, exhaust manifolds connected to the engine at opposite sides thereof, a radiator arranged forwardly of the engine and, fenders and running boards extending along the opposite sides of the vehicle, a circular slide valve carried by the exhaust manifolds at the opposite sides of the said engine and having a pair of discharge ports, pipe means communicating with one of each of the discharge ports of the said circular slide valves and each extending rearwardly thereof laterally of the body of the vehicle and in appressed relation with the fenders and running boards thereof, and pipe means communicating at one end with the other of the discharge ports of each of the said circular slide valves and positioned contrariwise of the front of the vehicle and in close proximity to the radiator thereof and each communicating at its other end with the said first-mentioned pipe means, said valve being suited to direct the heated exhaust gases directly into the first-mentioned pipe means or to direct the same into the said first pipes by way of the said second-mentioned pipes, whereby the pipes may heat the fenders to prevent the formation of ice thereon or heat the radiator to prevent freezing of the same in addition to heating the said fenders.

4. In an automotive vehicle having an engine, fenders and running boards, a conduit incorporated in the said fender and running board at either side of the said vehicle, circular slide valves carried by the exhaust manifolds at either side of the said engine and each having a pair of discharge ports, pipe means communicating with one of the discharge ports of each of the circular slide valves and with the corresponding of said conduits, and pipe means communicating at one end with the other of the discharge ports of each of the said circular slide valves and positioned contrariwise of the front of the vehicle and in close proximity to the radiator thereof and each communicating at its other end thereof with the other said conduits.

LARKIN J. MILLER.